(12) United States Patent
Slutz et al.

(10) Patent No.: US 6,382,731 B1
(45) Date of Patent: May 7, 2002

(54) LOAD HAULING VEHICLE WITH SIDEWALL RAISING AND LOWERING MECHANISM

(75) Inventors: Michael Slutz, North Canton; John D Slutz, East Sparta; Neal W Slutz, Bolivar, all of OH (US)

(73) Assignee: JMW Welding & Manufacturing INC, Canton, OH (US)

( * ) Notice: Subject to any disclaimer, the term of this patent is extended or adjusted under 35 U.S.C. 154(b) by 0 days.

(21) Appl. No.: 09/603,379

(22) Filed: Jun. 26, 2000

(51) Int. Cl.[7] .................................................. B60P 1/26
(52) U.S. Cl. ............................. 298/22 R; 298/23 MD; 298/23 M; 296/184; 296/57.1; 296/36
(58) Field of Search .................................. 296/184, 181, 296/182, 57.1, 36, 26.12, 26.15; 298/17 R, 22 R, 18, 23 MD, 23 M

(56) References Cited

U.S. PATENT DOCUMENTS

| | | | |
|---|---|---|---|
| 1,440,155 A | * 12/1922 | Junkin | 298/22 R X |
| 1,517,697 A | * 12/1924 | Barrett | 296/184 X |
| 1,812,915 A | 7/1931 | Wright | 298/17.7 |
| 1,965,476 A | 7/1934 | Smith | 298/38 |
| 2,953,408 A | 9/1960 | Koenig | 296/148 |
| 3,094,351 A | * 6/1963 | Gwinn, Jr. | 296/184 |
| 3,977,718 A | * 8/1976 | Nordberg | 296/57.1 |
| 4,076,310 A | * 2/1978 | Schwalm | 296/57.1 X |
| 4,165,121 A | * 8/1979 | Hori et al. | 296/57.1 |
| 4,348,045 A | * 9/1982 | Hori et al. | 296/57.1 X |
| 4,826,237 A | * 5/1989 | Socha | 296/184 |
| 5,271,652 A | * 12/1993 | Watanabe et al. | 296/36 |
| 5,518,287 A | * 5/1996 | Totani | 296/57.1 |
| 5,681,095 A | * 10/1997 | Martin | 296/184 X |

FOREIGN PATENT DOCUMENTS

| | | | | |
|---|---|---|---|---|
| DE | 24 17 882 A1 | * 10/1975 | | 296/36 |
| JP | 54-317 | * 1/1979 | | 296/36 |
| JP | 5-58350 A | * 3/1993 | | 296/36 |

* cited by examiner

Primary Examiner—Joseph D. Pape
Assistant Examiner—Patricia Engle
(74) Attorney, Agent, or Firm—Paul E Milliken; Ray L Weber

(57) ABSTRACT

A load hauling vehicle such as a truck or trailer having a bed which can be loaded or unloaded either from the side or the rear of the bed. A typical vehicle such as a trailer shown herein has a tail gate which can be opened and has one or both side walls which are hinged at the bottom edge to an adjacent edge of the bottom of the bed so that the sidewalls can be swung by a power activated linkage assembly, from an upwardly extending closed position to a downwardly extending open position. The trailer bed can also be tilted upwardly and rearwardly in the manner of a typical dump truck to empty a load out the back end of the trailer bed when the tail gate is released to open. The trailer bed can be raised to a dump position by a typical hydraulic actuator.

19 Claims, 5 Drawing Sheets

LOAD HAULING VEHICLE WITH SIDEWALL RAISING AND LOWERING MECHANISM

FIELD OF THE INVENTION

This invention relates to load hauling vehicles such as trucks or towable trailers which may be towed by towing vehicles and in particular to vehicles having beds which can be loaded or unloaded either from the side or the rear of the bed.

The trailer shown as an example herein in addition to a tail gate which can be opened, also has one or both side walls which are hinged at the bottom edge to an adjacent edge of the bottom of the trailer so that the sidewalls can be swung from an upwardly extending closed position to a downwardly extending open position. The trailer bed can also be tilted upwardly and rearwardly in the manner of a typical dump truck to empty a load out the back end of the trailer bed when the tail gate is released to open. The trailer bed can be raised to a dump position by a typical hydraulic actuator.

BACKGROUND OF THE INVENTION

In the past is has been known to have truck beds or trailer beds which may be tilted in alternate directions to dump a load from either the rear or from one more of the sides. Typical examples of such dump trucks are show by U.S. Pat. No. 1,812,915 (Wright); U.S. Pat. No. 1,965,476 (Smith); and U.S. Pat. No. 2,953,408 (Koenig). These are but a few of the many dump trucks which have various detailed mechanisms for raising the truck beds to one or more different dump positions to dump from either the rear or from the sides.

The present invention is not however intended to dump loads from the side of the bed by tilting the bed but instead swings open the sidewall to permit side loading and unloading by fork lifts of other material handling equipment. The trailer of this invention is particularly useful in hauling different types of cargo. The present trailer has a long bed which is especially useful in hauling elongated objects such as long bar stock or pipes which may extend the full length of the bed. Such objects are loaded and unloaded by swinging down the sidewall to provide access to the load by material handling equipment.

When, on the other hand, aggregate material such as sand, gravel or other loose material is hauled it the bed in may be more suitable to raise the front end of the bed to dump the load from the rear end of the bed as would be done in a conventional dump truck.

Thus it may be seen that a trailer of this type can carry a load of elongated items in one direction and on the return trip can carry a load of loose aggregate material. It can also be seen that prior art dump truck which dump both to the side and to the rear are not suited to hauling elongated items but more suited to hauling only aggregate material.

OBJECTS OF THE INVENTION

It is an object of this invention to provide a vehicle which is designed to carry multiple types of cargo which may be either elongated items or loose aggregate materials.

Another object of this invention is to provide a vehicle which can be loaded and unloaded by either the side or from the rear of the trailer bed.

A still further object of this invention is to provide a vehicle in which long sidewalls can be swung upwardly and downwardly by a power actuator.

An even further of the invention is provide a vehicle having a power operated latch on the end of the sidewall to secure the side wall in a closed position when a load is to be hauled.

These and other objects of the invention will become more fully apparent as the description proceeds in the following specification and the attached drawings.

SUMMARY OF THE INVENTION

This invention is a load carrying vehicle such as a truck or trailer which has a chassis; a bed mounted on top of the chassis; the bed having a bed bottom, a front end having a front end wall, a pair of opposed sidewalls, and a rear end having a rear door hingedly attached to the bed to permit it to be opened; at least one of the sidewalls having a lower edge hingedly connected by a hinge means to an adjacent edge of the bed bottom to permit the sidewall to be opened downwardly to provide side access to the bed for side loading and unloading; a sidewall actuator means mounted adjacent to the hinge means: and a linkage means pivotally connecting the sidewall actuator means and at least one sidewall to cause the sidewall to move back and forth between an upwardly extending closed position and a downwardly extending open position. The vehicle may also include a rearwarwdly tiltable bed for dumping a load out the rear end of bed.

DETAILED DESCRIPTION OF THE INVENTION

Figure 1:
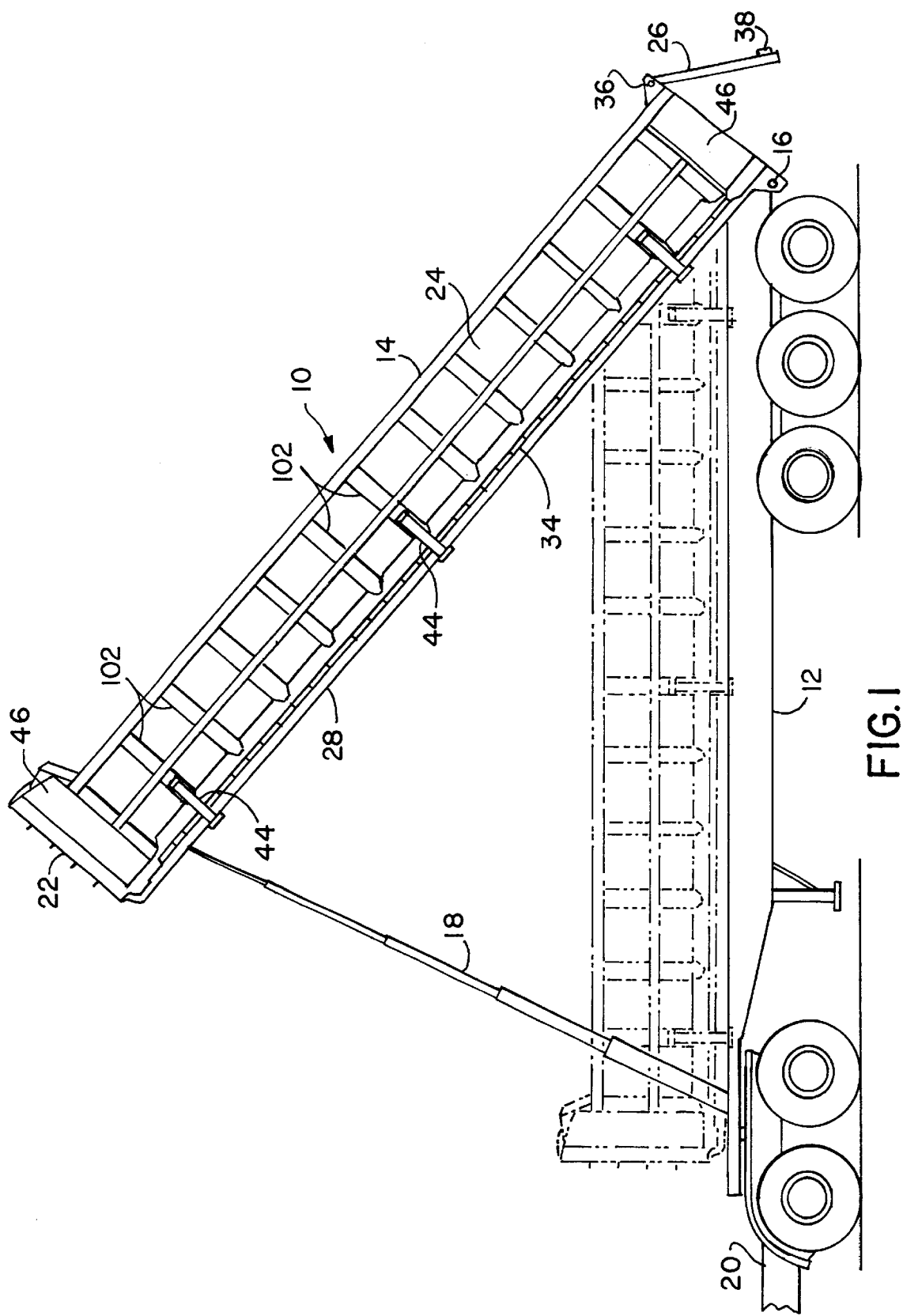
FIG. 1 is a side elevational view of the trailer of the invention showing the trailer bed in the raised position.

Referring now to FIG. 1 of the drawings, towable trailer is indicated generally by the numeral 10. The trailer 10 has a chassis 12 and a bed 14 which is raised upwardly about pivot pins 16 by a telescoping hydraulic actuator 18. The pivot pins are attached at the rear end of the chassis 12. The chassis 12 is pivotally attached in a conventional manner to the rear of a towing vehicle 20 shown in part in FIG. 1.

Figure 3:
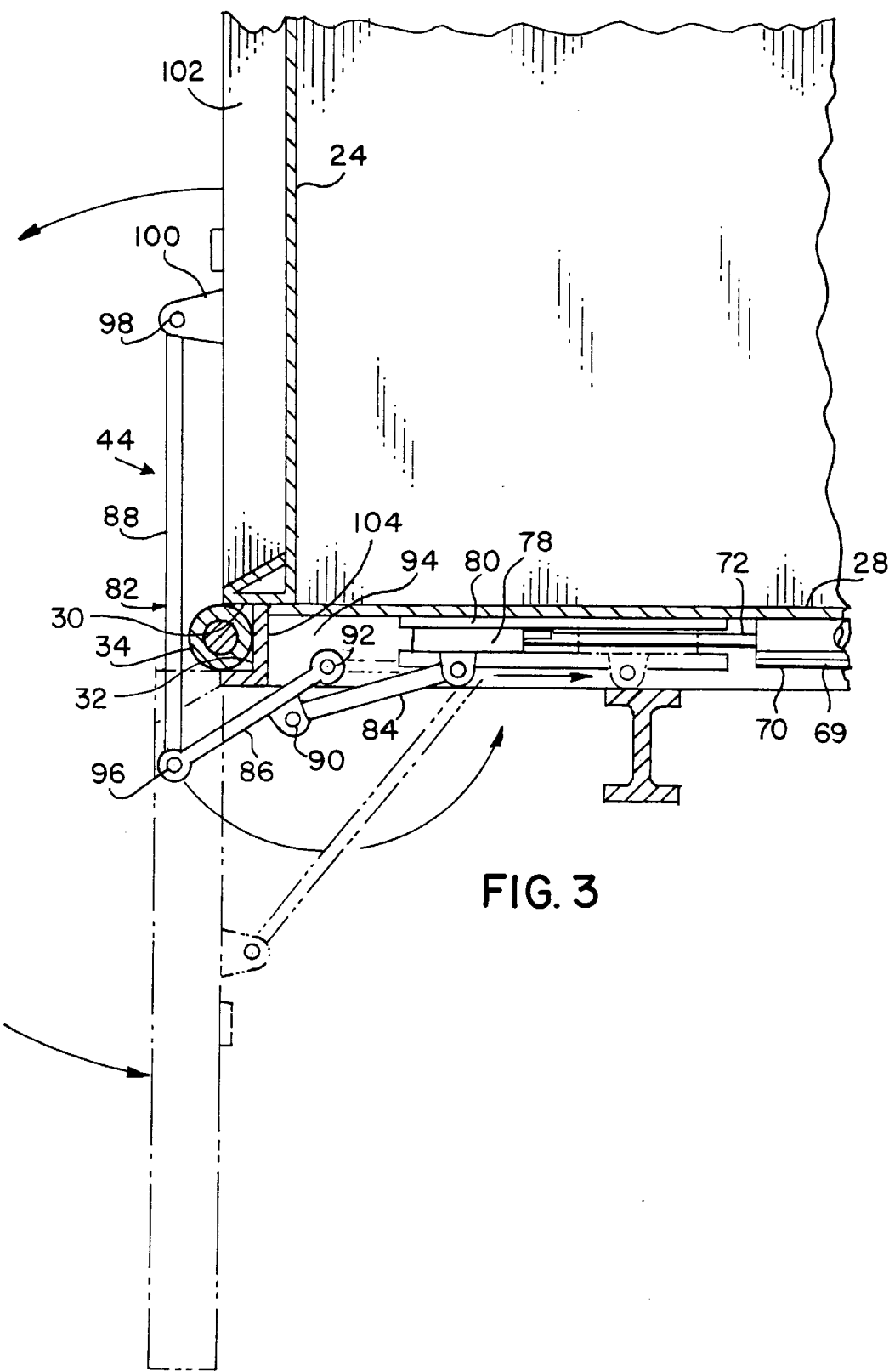
FIG. 3 is a fragmentary cross-sectional view of a portion of the bed of the trailer of the invention showing one of the actuator mechanism for opening and closing a sidewall of the trailer bed.

The bed 14 has a front end wall 22, a pair of opposite sidewalls 24, a tail gate 26, and a bottom 28. At least one of the sidewalls 24 has its bottom edge 30 attached to a side edge 32 by a hinge 34 as shown in FIGS. 1 and 3. The hinge 34 is preferably in the form of a piano hinge and extends continuously for the length of the sidewall. Other separate hinges can also be used in lieu of the continuous hinge shown.

The tailgate 26 can be attached by tailgate pivots 36 at the top rear corner of the sidewall. A tailgate latch 38 is provided at each bottom corner of the tailgate 26 to hold the tailgate in the closed position while hauling a load of material.

Figure 2:
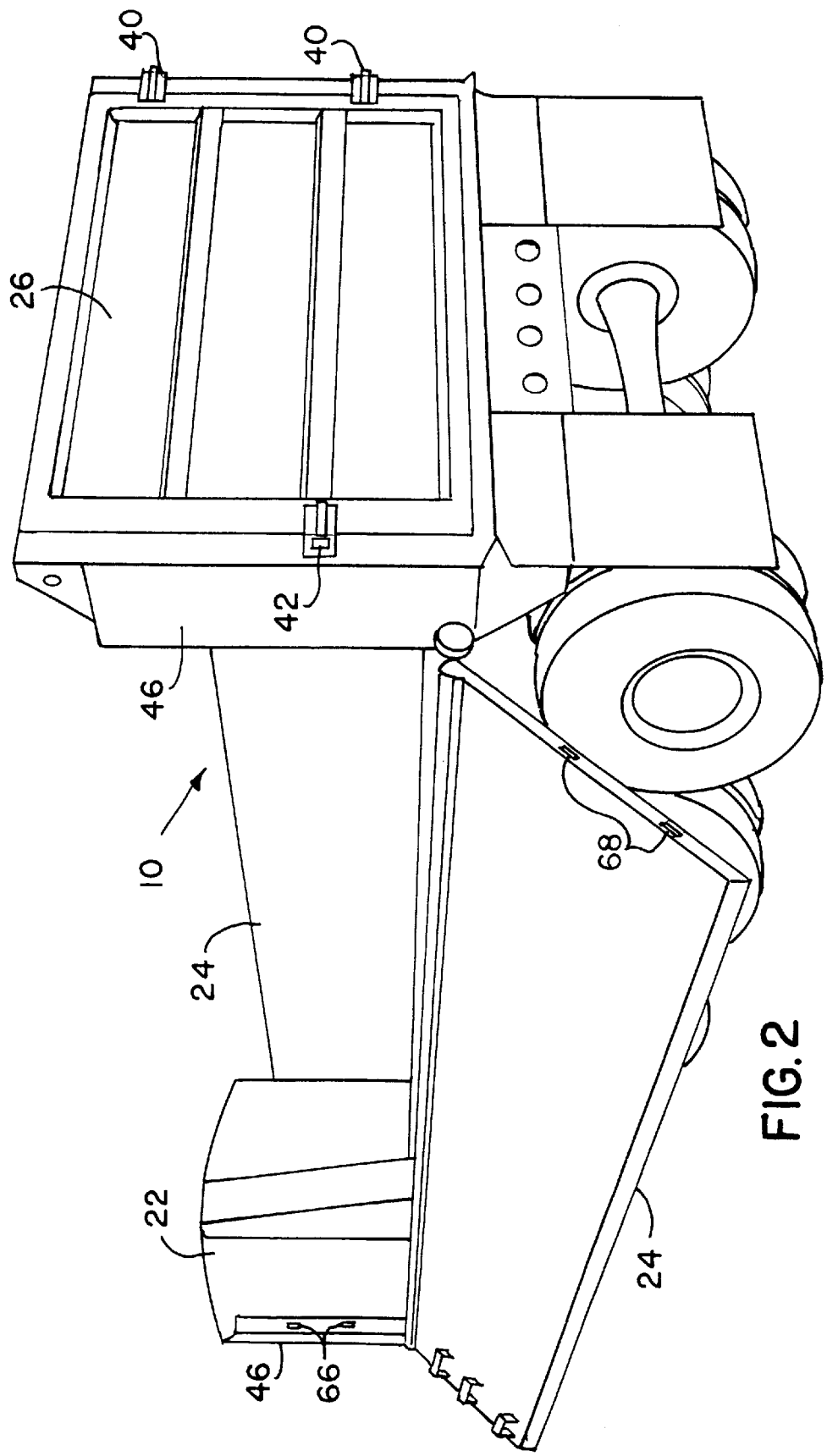
FIG. 2 is a perspective view of the trailer of the invention showing the bed in the lowered position and with one of the sidewalls swung downward into an open position.

An alternative in FIG. 2 shows the tail gate 26 hinged at one side edge with hinges 40 and retained by a latch 42 on the opposite side edge so that the tailgate may be swung open from the side instead of from the top and previously shown in FIG. 1.

Three sidewall opener mechanisms 44 shown in FIGS 1, 3 and 4 will be explained in more detail later.

As shown in FIGS. 1 and 2, a fixed vertical corner post 46 is positioned adjacent to each end of each hinged sidewall 24 and has its bottom end secured to the bed bottom.

Figure 5:
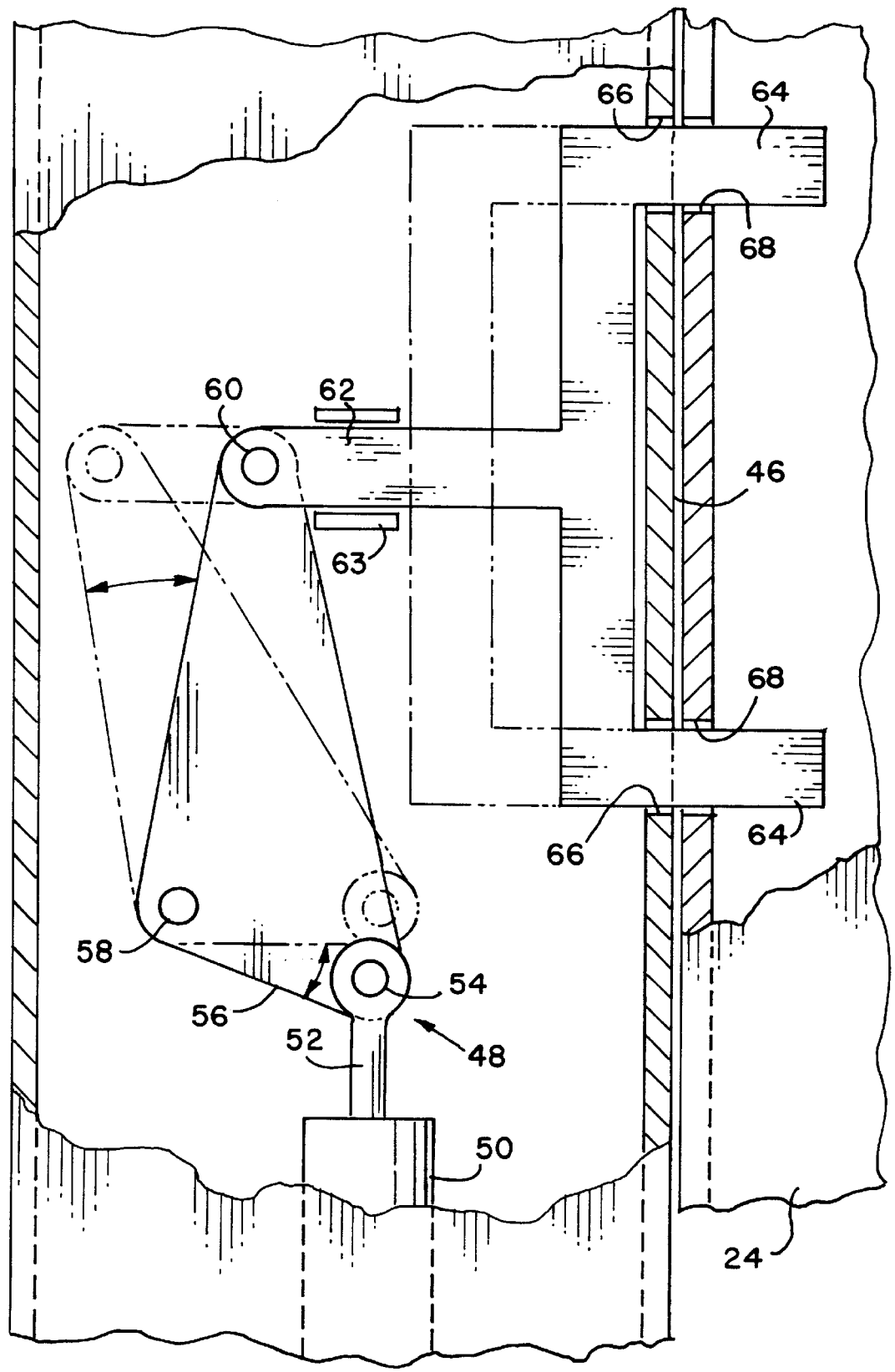
FIG. 5 is fragmentary broken away side elevational view of one of the power actuate latches from securing one end of the side wall in a closed position.

A power operated latch mechanism 48 is shown in FIG. 5. The latch mechanism 48 is mounted inside each corner post 46. A hydraulic cylinder 50 is fixedly attached to the post 46 and has an axially slideable piston rod 52 extending therefrom. The piston rod 52 has its outer end connected by pivot pin 54 to a triangular linkage plate member 56 which pivotally moves about a pivot pin 58 attached to the post 46 at a fixed location. A pivot pin 60 attached to an opposite end of the plate member 56 is attached to a sliding bolt member 62 passing through guides 63 and having two prongs 64 extending through slots 66 in the post 46. When the piston rod 52 is in the extended position, the plate member 56 moves to the position shown in chain dotted lines and the prongs 64 are withdrawn inside the post 46. When the piston rod 52 is retracted, the plate member 56 moves to the position shown in solid lines and the prongs 64 are extended from the posts to engage slots 68 in the end of the sidewall 24 to retain the sidewall in a closed upright position.

Figure 4:
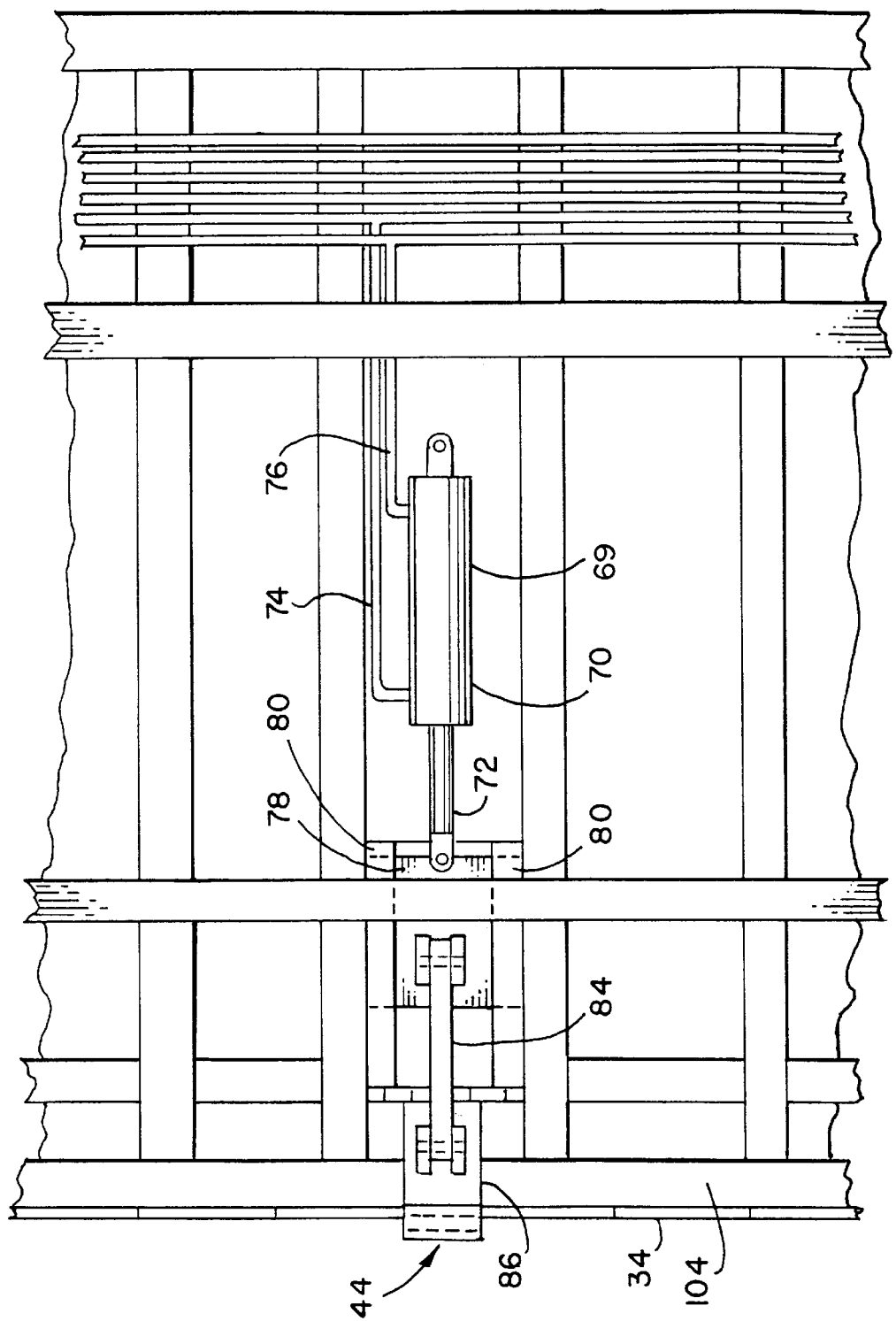
FIG. 4 is a fragmentary bottom view of the bed of the trailer of the invention showing one of the actuator mechanisms such as that shown in FIG. 3.

Referring again to the sidewall opener mechanism 44 the details are best shown in FIGS. 3 and 4. A hydraulic actuator 69 having a cylinder 70 and an axially movable piston rod 72 extending therefrom is fixedly attached to the bed bottom 28. Hydraulic lines 74 and 76 are attached to opposite ends of the actuator to provide power to move the piston rod 72 axially back and forth with respect to the cylinder 70.

The piston rod 72 has its outer end attached to a sliding block 78 which is moveable transversely of the bed 17 in guide tracks 80 attached to the bed bottom 28. Pivotally connected to the block 78 is a linkage assembly 82 having links 84, 86 and 88. Link 84 has one end connected to an intermediate pivot pin 90 on the link 86. The link 86 has a pivot pin 92 connected in a fixed location on transverse frame members 94 of the bed bottom 28. The opposite end of the link 86 is connected by a pivot pin 96 to one end of the link 88. The opposite end of the link 88 is pivotally connected by a pivot pin 98 to a bracket 100. The bracket 100 is fixedly attached to a reinforcing rib 102 on the sidewall 24.

As shown in FIG. 3, the hinge 34 is attached to the bottom edge of the sidewall 24 and an L-shaped frame member 104 positioned along the outside edge of the bed bottom 28. As may be seen in FIG. 1 three identical sidewall opener mechanisms 44 are positioned in spaced apart locations along the sidewall 24. Other numbers of sidewall openers can be used depending upon the size and weight of the sidewall to be opened and closed.

In operation, when the piston rod 72 is moved to the extended position, the block 78 is moved along the tracks 80 to a position where it moves the linkage assembly 82 to the position shown in solid lines in FIG. 3 which moves the sidewall 24 into the closed upright position. When the piston rod 72 is moved to the retracted position, it acts upon the linkage assembly 82 to swing the sidewall 24 downwardly into an open position as shown in chain dotted lines in FIG. 3. When the sidewall 24 is moved into the closed upright position the end latches 48 shown in FIG. 5 have prongs 64 extended into slots 68 as previously described to secure the sidewall 24 in the closed position.

It can be seen in FIGS. 1 and 4 that the bed 14 is constructed in the conventional manner from sheet metal with reinforcing ribs such as the ribs 102 and beams such as the frame members 94 underneath the bed bottom 28. Since the overall bed construction is conventional the reinforcing members will not be described in further detail.

While for simplicity, only one sidewall is shown as hinged to the bed bottom, either or both side walls can be hinged in the same manner and provided with one or more opener mechanisms.

It should also be recognized that the hinged sidewall can be used on either a dump bed or one fixed to the chassis of a vehicle. It can also be used either on a trailer bed or a truck bed.

It is noted that while a hydraulic actuator has been shown to illustrate the invention various types actuators can also be used.

These and other variations can also be used without departing from the scope of the invention.

What is claimed is:

1. A trailer comprising:
    a chassis;
    a bed mounted on top of the chassis;
    the bed having a bed bottom, a front end having a front end wall, a pair of opposed sidewalls, and a rear end having a rear door hingedly attached to the bed to permit it to be opened;
    at least one of the sidewalls having a lower edge hingedly connected to an adjacent edge of the bed bottom by a longitudinally extending hinge means to permit the sidewall to be opened downwardly to provide side access to the bed for side loading and unloading;
    a sidewall actuator means in a substantially fixed position beath the bed bottom in close proximity thereto and in substantially parallel relationship therewith; and
    a linkage means pivotally connecting a longitudinally slidable piston rod of the sidewall actuator means and at least one sidewall to cause the sidewall to move back and forth between an upwardly extending closed position and a downwardly extending open position when the piston rod moves between a retracted and an extended position.

2. A trailer as claimed in claim 1 wherein each linear actuator is mounted in such a position that its axis extends transversely across the bottom of the trailer bed.

3. A trailer as claimed in claim 2 wherein the outer end of each piston rod is connected to a slidable block positioned in a track extending transversely across the bottom of the trailer, the block being moved by the piston rod transversely back and forth along the track.

4. A trailer as claimed in claim 3 wherein each slidable block is pivotally connected through a linkage assembly to a pivot point on the outer surface of the sidewall to cause movement of the sidewall upon movement of the actuator and the linage assembly.

5. A trailer as claimed in claim 1 including a latch means on each end of the sidewall to secure the sidewall in the upwardly extending closed position.

6. A trailer as claimed in claim 1 wherein both sidewalls are hingedly connected to a respective edge of the bed bottom to permit either sidewall to be opened downwardly.

7. A multipurpose dump trailer comprising:
    a chassis;

a bed mounted on top of the chassis;

the bed having a bed bottom, a front end having a front end wall, a pair of opposed sidewalls, and a rear end having a rear door hingedly attached to the bed to permit it to be opened;

the bed pivotally attached to the chassis by a pivot means extending along a transverse axis and positioned to permit the front end of the bed to be raised upwardly to dump contents from the rear end of the bed when the rear door is opened;

a bed actuator means connected to the chassis and the bed and adapted to raise and lower the front end of the bed;

at least one of the sidewalls having a lower edge hingedly connected to an adjacent edge of the bed bottom by a longitudinally extending binge means to permit the sidewall to be opened downwardly to provide side access to the bed for side loading and unloading;

a sidewall actuator means mounted beneath the bed floor in a substantially fixed horizontal position in close proximity to an underside of the bed bottom; and a linkage means pivotally connecting the sidewall actuator means and at least one sidewall lo cause the sidewall to move back and forth between an upwardly extending closed position and a downwardly extending open position.

8. A trailer as claimed in claim 7 wherein the actuator means is at least one linear actuator having a piston rod extending from a cylinder and axially slideable between an extend position and a retracted position, the piston rod having an outer end connected to the linkage means to move the linkage in a direction to close the sidewall when the piston rod is in the extended position and to open the sidewall when the piston rod is in the retracted position.

9. A trailer as claimed in claim 8 wherein each linear actuator is mounted in such a position that its axis extends transversely across the bottom of the trailer bed.

10. A trailer as claimed in claim 9 wherein the outer end of each piston rod is connected to a slidable block positioned in a track extending transversely across the bottom of the trailer, the block being moved by the piston rod transversely back and forth along the track.

11. A trailer as claimed in claim 10 wherein each slidable block is pivotally connected through a linkage assembly to a pivot point on the outer surface of the sidewall to cause movement of the sidewall upon movement of the actuator and the linkage assembly.

12. A trailer as claimed in claim 7 including a latch means on each end of the sidewall to secure the sidewall in the upwardly extending closed position.

13. A trailer as claimed in claim 12 wherein the latch means is operated by a hydraulic actuator.

14. A trailer as claimed in claim 7 wherein both sidewalls are hingedly connected to a respective edge of the bed bottom to permit either sidewall to be opened downwardly.

15. A trailer as claimed in claim 8 wherein the linear actuator is a hydraulic actuator.

16. A trailer as claimed in claim 7 wherein the sidewall actuator means and linkage means includes a plurality of sidewall actuators and each of the actuators being connected through a respective linkage assembly to the sidewall to be opened and closed.

17. A load hauling vehicle comprising:

a chassis;

a bed mounted on top of the chassis;

the bed having a bed bottom, a front end having a front end wall, a pair of opposed sidewalls, and a rear end having a rear door hingedly attached to the bed to permit it to be opened;

at least one of the sidewalls having a lower edge hingedly connected by a hinge means to an adjacent edge of the bed bottom to permit the sidewall to be opened downwardly to provide side access to the bed for side loading and unloading;

a sidewall actuator means mounted adjacent to the hinge means in a substantially fixed horizontal position in close proximity to an underside of the bed bottom; and a linkage means pivotally connecting the sidewall actuator means and at least one sidewall to cause the sidewall to move back and forth between an upwardly extending closed position and a downwardly extending open position.

18. A vehicle as claimed in claim 17 wherein the actuator means includes a plurality of hydraulic actuators in spaced apart relationship from each other on the bed bottom with each actuator connected through a respective linkage assembly to the sidewall to cause the sidewall to open and close upon activation of the actuator.

19. A vehicle as claimed in claim 18 wherein both sidewalls are hingedly connected to the bed bottom.

* * * * *